E. R. DURGIN.
TEMPLE FOR SPECTACLES.
APPLICATION FILED JULY 26, 1917.
1,304,168.
Patented May 20, 1919.
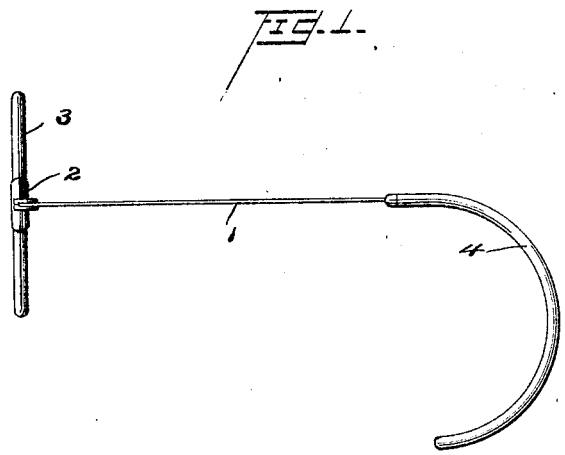
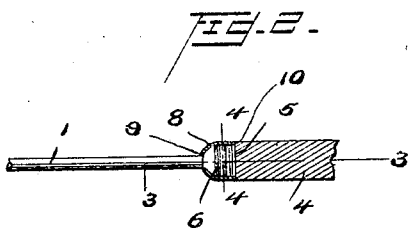
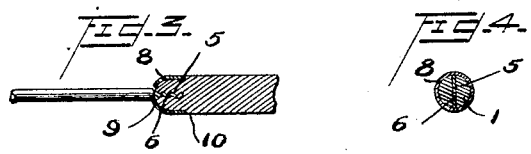
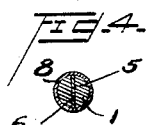
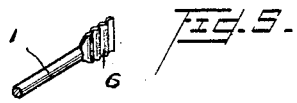
Inventor
Edgar R. Durgin
By Cyrus N. Anderson
Attorney

UNITED STATES PATENT OFFICE.

EDGAR R. DURGIN, OF NEWARK, NEW JERSEY, ASSIGNOR TO NEW JERSEY OPTICAL CO., OF NEWARK, NEW JERSEY, A CORPORATION OF NEW JERSEY.

TEMPLE FOR SPECTACLES.

1,304,168.  Specification of Letters Patent.  Patented May 20, 1919.

Application filed July 26, 1917. Serial No. 182,869.

*To all whom it may concern:*

Be it known that I, EDGAR R. DURGIN, a citizen of the United States, residing in Newark, county of Essex, State of New Jersey, have invented certain new and useful Improvements in Temples for Spectacles, of which the following is a specification.

My invention relates to an improvement in temples for spectacles of the character in which the temple comprises a wire portion consisting of metal and a non-metallic portion, the latter constituting the rear portion of the temple which is adapted to extend over and around the rear portion of an ear of a person wearing glasses provided with such temple.

The metal wire portion of the temple constituting the front part thereof is adapted to be connected at its forward end to a lens or, more correctly speaking, to the rim extending around a spectacle lens or to a clip secured to such lens.

More specifically stated, my invention relates to the connection between the metallic and non-metallic portions of the temple, and it has for its object to provide an improvement in the connection between these two portions whereby they may be more readily connected or secured together than heretofore has been practicable, as far as I am aware.

A further object is to simplify the construction of connection between these two portions and at the same time produce a neater appearing effect; also by the employment of my invention a cheapening of the construction may be effected.

In order that my invention may be readily understood and its practical advantages more fully appreciated reference should be had to the accompanying drawing in which I have illustrated a convenient embodiment thereof. It will be understood, however, that changes in the details of construction may be made within the scope of the claims without departing from my invention.

In the drawing:—

Figure 1 is a side elevation of a pair of spectacles provided with temples embodying my invention;

Fig. 2 is a view partly in longitudinal section and partly in elevation of the portion of the temple including the connection between the metallic and non-metallic portions thereof;

Fig. 3 is a similar view taken on the line 3—3 of Fig. 2;

Fig. 4 is a transverse sectional view taken on the line 4—4 of Fig. 2; and

Fig. 5 is a perspective view of the rear end portion of the metallic part of the temple.

Referring to the drawing, 1 designates the metallic wire portion or temple side of a temple connected at its forward or front end to a clip 2 having connection with a lens 3 of a pair of spectacles. 4 designates the rear curved portion of the temple, which portion consists of a suitable non-metallic material such as zylonite. The portion 4, as illustrated, is of substantially larger diameter than the wire portion 1 of the temple.

In connecting the two portions, 1 and 4, together I provide the latter at its forward or front end with a slot or kerf 5, which extends entirely across and a relatively short distance into the same; that is, the said slot or kerf opens laterally.

The rear end of the metallic wire portion 1 of the temple is provided with a flattened out or flared portion 6 which is adapted to fit loosely into the slot 5. The surface of the said flattened or flared portion 6 may be smooth, roughened or corrugated, but preferably these surfaces should be either rough or corrugated, being shown in the latter condition, so that when the opposite sides of the slot 5 are clamped against such surfaces the two parts become so interlocked that their separation by a longitudinal pull upon the two parts, 1 and 4, tending to separate them, becomes practically impossible. The ridges formed by the corrugations constitute projections which engage and interlock with the side walls of the slot or kerf.

For the purpose of holding the portions of the part 4 upon opposite sides of the part 5 clamped firmly against the opposite sides of the flattened out or flared portion 6 I have provided a ferrule 8 having an opening 9 through which the part 1 of the temple is inserted before the flared or flattened out end portion 6 is formed.

The flattened or flared portion 6, having been placed in position within the slot 5, the ferrule is slipped into position over the front end of the part 4 and is thereafter compressed and clamped against the same, the rear edges of the ferrule being embedded in the surface of the portion 4, as indicated at 10, so as to leave the adjacent surfaces of the ferrule and the part 4 substantially flush or even. Clamping the ferrule as described forces the portions of the part 4 upon the opposite sides of the slot 5 firmly and securely against the opposite sides of the flattened or flared portion 6 to thereby firmly and securely interlock and fasten the two parts, 1 and 4, together as shown. The ferrule is also clamped against the opposite edges of the flared portion 6 of the temple wire. It will also be noted that the forward end of the ferrule fits closely the temple wire 1, the latter passing through the opening in said end.

My invention is not limited to a slot 5 of any particular depth or to a flattened or flared portion 6 of any particular length. Preferably, however, the said slot and flattened portion should not extend beyond the edge of the ferrule 8. If the slot extended beyond the edge of the ferrule it would, of course, be visible and if the flattened part 6 should extend beyond the edge of such ferrule it also would be visible not only at its outer narrow edges, but also other parts thereof would be visible because of the transparency of the zylonite of which the part 4 usually consists.

I claim:—

1. In a temple for spectacles, in combination, a non-metallic rear end member, said member having a narrow slot in its forward end, said slot extending across the said forward end and a relatively small wire having its rear end portion flattened and extended into the said slot, the parts of said non-metallic member upon opposite sides of the said flattened portion fitting against the opposite sides of the latter and means for holding the said parts clamped against said flattened portion, substantially as described.

2. A temple for spectacles comprising a non-metallic rear end portion of relatively great diameter, said portion being provided at its forward end with a narrow slot extending transversely of and entirely across said front end portion and a wire portion the front end of which is adapted to be connected with a lens and which terminates at its rear end in a flattened portion, the opposite sides of said flattened portion being substantially parallel and the width of the said flattened portion being substantially equal to the diameter of the said rear end portion of the temple at its front end where the said slot is formed and the said flattened portion being situated within the said slot, said flattened portion being corrugated and a ferrule through which the said wire portion of the temple extends and the said ferrule being fitted over the front end of the rear non-metallic portion of the said temple and holding the portions thereof on opposite sides of said slot firmly against the opposite sides of the said flattened portion, substantially as described.

3. The combination, with an enlarged ear hook member having a laterally opening slot formed therein, of a temple side having a head portion which may be introduced laterally into the slot and interlocking with the walls of the slot and means for securing the parts in interlocking engagement.

4. The combination, with a non-metallic ear hook, of a temple side having a head adapted to be forced laterally into the ear hook and a ferrule encircling the joint to prevent lateral disengagement of the parts.

5. The combination, with a non-metallic ear hook portion having a kerf formed therein, of a temple side having a head adapted to fit within the kerf and projections to bite into the walls of the kerf and secure the parts against relative longitudinal movement, and means encircling the joint for retaining the projections in interlocking engagement with the ear hook.

6. The combination, with a kerfed non-metallic ear hook, of a temple side having a head fitting within the kerf, projections on one of said parts interlocking with the other of said parts for securing them against relative longitudinal movement, and additional means for securing the parts against lateral disengaging movement.

7. The process of uniting a side and ear hook of a temple for an ophthalmic mounting, consisting in slotting one of said parts to provide a kerf, forming the other of said parts with a flattened portion adapted to fit within the kerf, forming projections on one of the parts to interlock with recesses in the other of said parts, and applying a ferrule around the parts by pressure to compress the joint and secure the parts against disengagement.

8. The combination, with an ear hook section having a kerf formed in one end thereof, of a temple side having a head shaped to fit the kerf, one of said parts having projections interlocking with the other of said parts to lock them against longitudinal separating movement, and a ferrule surrounding the joint and engaging the temple side at both sides of the kerf and tightly embracing the adjacent portion of the ear hook to brace the parts against relative lateral or relative angular bending movement.

9. The combination, with an ear hook and a temple side, of a laterally opening joint connecting said parts, and a ferrule forced over the joint to lock the parts against lateral separation.

10. The combination, with an ear hook section and a temple side having a laterally opening joint and having interlocking parts preventing relative longitudinal movement of the parts, of means embracing said parts at the joint to prevent lateral separation thereof.

11. The combination, with a temple side and an ear hook section, said parts having a laterally opening joint, of means forced around said joint under pressure to insure tight union of the parts and prevent lateral disengagement thereof.

12. The combination, with a temple side and ear hook section having a laterally opening interlocking joint, of a ferrule having one end closely fitting one of said parts and the opposite end fitted over and closely engaging the other of said parts, said ferrule being compressed to bite into the inclosed part and hold the joint under compression while preventing lateral disengagement of the parts.

13. The combination, with a temple side and ear hook section having a laterally opening joint, of a ferrule fitting over the joint and compressed thereonto to bite into and be partially embedded in one of the parts at the joint.

14. The combination, with a kerfed non-metallic ear hook, of a temple side having a head fitting within the kerf, projections on one of said parts interlocking with the other said parts for securing them against relative longitudinal movement.

In testimony that I claim the foregoing as my invention I have hereunto signed my name this 24th day of July, A. D. 1917.

EDGAR R. DURGIN.

Copies of this patent may be obtained for five cents each, by addressing the "Commissioner of Patents, Washington, D. C."